(12) United States Patent
Rhee et al.

(10) Patent No.: US 10,331,941 B2
(45) Date of Patent: Jun. 25, 2019

(54) FACE RECOGNITION METHOD AND APPARATUS

(71) Applicant: Samsung Electronics Co., Ltd., Suwon-si, Gyeonggi-do (KR)

(72) Inventors: Seon Min Rhee, Seoul (KR); Jungbae Kim, Seoul (KR); Byungin Yoo, Seoul (KR); Jaejoon Han, Seoul (KR); Seungju Han, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/188,437

(22) Filed: Jun. 21, 2016

(65) Prior Publication Data

US 2016/0379041 A1 Dec. 29, 2016

(30) Foreign Application Priority Data

Jun. 24, 2015 (KR) .................. 10-2015-0089503
Dec. 10, 2015 (KR) .................. 10-2015-0175672

(51) Int. Cl.
*G06K 9/00* (2006.01)
*G06K 9/62* (2006.01)
*G06T 19/20* (2011.01)
*G06T 15/04* (2011.01)

(52) U.S. Cl.
CPC ..... *G06K 9/00275* (2013.01); *G06K 9/00208* (2013.01); *G06K 9/00248* (2013.01);
(Continued)

(58) Field of Classification Search
CPC ........... G06K 9/00248; G06K 9/00288; G06K 9/00281; G06K 9/00208; G06K 9/6296;
(Continued)

(56) References Cited

U.S. PATENT DOCUMENTS 8,406,483 B2 3/2013 Zhang et al.
8,593,452 B2 11/2013 Solem et al.
(Continued)

FOREIGN PATENT DOCUMENTS

KR 10-0955255 B1 4/2010
KR 10-1105435 B1 1/2012

OTHER PUBLICATIONS

Chen, Dong, et al. "Blessing of Dimensionality: High-dimensional Feature and Its Efficient Compression for Face Verification." *Proceedings of the IEEE Conference on Computer Vision and Pattern Recognition*, pp. 3025-3032. 2013.
(Continued)

*Primary Examiner* — Kenny A Cese
(74) *Attorney, Agent, or Firm* — Harness, Dickey & Pierce, P.L.C.

(57) ABSTRACT

Face recognition of a face, to determine whether the face correlates with an enrolled face, may include generating a personalized three-dimensional (3D) face model based on a two-dimensional (2D) input image of the face, acquiring 3D shape information and a normalized 2D input image of the face based on the personalized 3D face model, generating feature information based on the 3D shape information and pixel color values of the normalized 2D input image, and comparing the feature information with feature information associated with the enrolled face. The feature information may include first and second feature information generated based on applying first and second deep neural network models to the pixel color values of the normalized 2D input image and the 3D shape information, respectively. The personalized 3D face model may be generated based on transforming a generic 3D face model based on landmarks detected in the 2D input image.

18 Claims, 13 Drawing Sheets

(52) U.S. Cl.
CPC ....... *G06K 9/00288* (2013.01); *G06K 9/6271* (2013.01); *G06K 9/6296* (2013.01); *G06T 15/04* (2013.01); *G06T 19/20* (2013.01); *G06T 2219/2021* (2013.01)

(58) Field of Classification Search
CPC ........... G06K 9/00228; G06K 9/00214; G06K 9/00275; G06K 9/6271; G06T 2219/2021; G06T 15/04; G06T 19/20
See application file for complete search history.

(56) References Cited

U.S. PATENT DOCUMENTS

| | | | | |
|---|---|---|---|---|
| 2007/0080967 | A1* | 4/2007 | Miller | G06K 9/00208 345/473 |
| 2008/0013798 | A1 | 1/2008 | Ionita et al. | |
| 2014/0341443 | A1 | 11/2014 | Cao et al. | |
| 2015/0125049 | A1* | 5/2015 | Taigman | G06K 9/00268 382/118 |
| 2015/0178554 | A1* | 6/2015 | Kanaujia | G06T 19/20 382/118 |
| 2016/0217318 | A1* | 7/2016 | Hayasaka | G06T 3/60 |

OTHER PUBLICATIONS

Taigman, Yaniv, et al. "DeepFace: Closing the Gap to Human-Level Performance in Face Verification." *Proceedings of the IEEE Conference on Computer Vision and Pattern Recognition*. 2014.
Cho, Kyoung-Sic, et al. "3D Active Appearance Model for Face Recognition." pp. 1006-1011. Feb. 2007.
Xiao, Jing, et al. "Real-Time Combined 2D+3D Active Appearance Models." *CVPR* (2). 2004.
Extended European Search Report dated Mar. 1, 2017 issued in corresponding European Patent Application No. 16175896.6.
Bai Jing et al: "Subset based deep learning for RGB-D object recognition", Neurocomputing, vol. 165, Mar. 14, 2015, pp. 280-292, XP029139636.
Liefeng Bo et al: "Unsupervised Feature Learning for RGB-D Based Object Recognition", Jan. 1, 2013, XP055344849.
Li Liu et al: "Learning discriminative representations from RGB-D video data", Aug. 1, 2013, XP055344851.
Hassner Tal: "Viewing Real-World Faces in 3D", 2013 IEEE International Conference on Computer Vision, IEEE, Dec. 1, 2013, pp. 3607-3614, XP032573080.
Volker Blanz et al: "A morphable model for the synthesis of 3D faces", Jul. 1, 1999, XP058128792.

* cited by examiner

FIG. 9B

|  | LM1 | LM2 | LM3 | ... | LM68 |
|---|---|---|---|---|---|
| LM1 | Distance (LM1,LM1) | Distance (LM1,LM2) | Distance (LM1,LM3) | Distance (LM1,...) | Distance (LM1,LM68) |
| LM2 | Distance (LM2,LM1) | Distance (LM2,LM2) | Distance (LM2,LM3) | Distance (LM2,...) | Distance (LM2,LM68) |
| LM3 | Distance (LM3,LM1) | Distance (LM3,LM2) | Distance (LM3,LM3) | Distance (LM3,...) | Distance (LM3,LM68) |
| ... | Distance (...,LM1) | Distance (...,LM2) | Distance (...,LM3) | Distance (...,...) | Distance (...,LM68) |
| LM68 | Distance (LM68,LM1) | Distance (LM68,LM2) | Distance (LM68,LM3) | Distance (LM68,...) | Distance (LM68,LM68) |

# FACE RECOGNITION METHOD AND APPARATUS

CROSS-REFERENCE TO RELATED APPLICATION

This application claims under 35 U.S.C. § 119 to Korean Patent Application No. 10-2015-0089503 filed on Jun. 24, 2015 and Korean Patent Application No. 10-2015-0175672 filed on Dec. 10, 2015 in the Korean Intellectual Property Office, the entire contents of which are incorporated herein by reference in its entirety.

BACKGROUND

1. Field

At least one example embodiment relates to face recognition technology for recognizing a face appearing in an image.

2. Description of the Related Art

Face recognition technology is considered a convenient and competitive bio-recognition technology that may verify a target without contact with the target. Face recognition technology may be dissimilar to other recognition technologies, for example, fingerprint and iris recognition, that require a user to perform a certain motion or an action. Face recognition technology has been widely used in various application fields, for example, security systems, mobile authentication, and multimedia searches due to convenience and effectiveness of the face recognition technology. However, using face recognition technology to recognize a user according to an image of the user may be sensitive to a face pose and a facial expression of a user, an occlusion, a change in illumination, and the like.

In some cases, the ability of a facial recognition system to recognize a user's face in an image of the user may include a pattern classifier. The pattern classifier may identify a registered face and a non-registered face. The pattern classifier may be trained to identify user faces based on, for example, a method using a neural network model. The neural network model may be a model obtained by modeling a feature of a human nerve cell through a mathematical expression, and may classify an input pattern as a desired (and/or, alternatively, predetermined) group.

In some cases, to solve an issue that the input pattern is classified as a desired (and/or, alternatively, predetermined) group, the neural network model may use an algorithm imitating an ability of human learning. Based on the algorithm, the neural network model may generate a mapping between the input pattern and an output pattern, which may be expressed as a learning ability of the neural network model.

SUMMARY

At least one example embodiment relates to a face recognition method.

In at least one example embodiment, a face recognition method may include: generating a personalized three-dimensional (3D) face model based on a two-dimensional (2D) input image of a user face; generating 3D shape information based on the personalized 3D face model, the 3D shape information including one or more sets of 3D surface coordinate values; generating a normalized 2D input image of the user face based on the personalized 3D face model; generating feature information associated with the user face, based on the 3D shape information and pixel color values of the normalized 2D input image; determining whether the user face included in the 2D input image correlates with a stored 2D image of an enrolled user face, based on determining whether the feature information associated with the user face correlates with feature information associated with the enrolled user face; and generating an unlocking command signal to enable user access to at least a portion of a terminal device, based on determining that the user face included in the 2D input image correlates with the stored 2D image of the enrolled user face.

The generating the feature information associated with the user face may include: generating first feature information based on applying a first deep neural network model to the pixel color values of the normalized 2D input image, and generating second feature information based on applying a second deep neural network model to the 3D shape information of the personalized 3D face model.

The generating of the 3D shape information may include: generating a depth image of the user face based on the personalized 3D face model, the depth image including a 3D shape associated with the user face; adjusting the 3D shape based on the normalized 2D input image of the user face; and generating the 3D shape information from the adjusted 3D shape.

The adjusting the 3D shape may include: identifying one or more meshes associated with a plurality of feature points in the normalized 2D input image; identifying one or more meshes associated with a plurality of feature points in the depth image; and adjusting the 3D shape based on a corresponding relationship between the one or more meshes associated with the normalized 2D input image and the one or more meshes associated with the depth image.

The generating of the 3D shape information may include: detecting one or more landmarks of the user face in the 2D input image, the one or more landmarks including one or more feature points indicating one or more boundaries or interfaces between different surfaces of the user face; and transforming a generic 3D face model to the personalized 3D face model based on the detected one or more landmarks.

The generating of the 3D shape information may include: generating one of a depth image of the user face and a normal image of the user face based on the personalized 3D face model; and generating the 3D shape information from at least one of the depth image and the normal image.

The generating the feature information associated with the user face may include: generating the first feature information based on applying the first deep neural network model to pixel depth values of a depth image and the pixel color values of the normalized 2D input image, the depth image being generated based on the personalized 3D face model.

The generating the feature information associated with the user face may include: generating the first feature information based on applying the first deep neural network model to surface normal information of a normal image of the user face, the normal image being generated based on the personalized 3D face model and pixel color values of the 2D input image.

The second deep neural network model may be an auto-encoder structured neural network model.

The generating the normalized 2D input image may include: generating pose information associated with a frontal face, based on the personalized 3D face model; and normalizing the 2D input image based on the pose information.

The generating the normalized 2D input image may include: detecting one or more landmarks associated with the user face based on the 2D input image of the user face; and normalizing the 2D input image based on the one or more detected landmarks.

The determining whether the user face included in the 2D input image correlates with the stored 2D image of the enrolled user face may include: generating final feature information associated with the 2D input image based on the first feature information and the second feature information; and generating a face recognition result based on comparing final feature information associated with the 2D input image to feature information associated with the stored 2D image.

In at least one example embodiment, a non-transitory computer-readable storage medium may store computer-readable instructions, the computer-readable instructions being executable by a processor to cause the processor to perform the face-recognition method.

At least one example embodiment relates to an apparatus.

In at least one example embodiment, an apparatus may include: a memory storing computer-readable instructions; and a processor configured to execute the computer-readable instructions to: detect one or more landmarks of a user face based on processing a two-dimensional (2D) image of the user face; generate a personalized three-dimensional (3D) face model based on the detected one or more landmarks; generate 3D shape information associated with the user face based on processing the personalized 3D face model; generate first feature information associated with the user face, based on applying a first deep neural network model to pixel color values of the 2D image of the user face; and generate second feature information associated with the user face, based on applying a second deep neural network model to the 3D shape information, wherein the first deep neural network model differs from the second deep neural network model.

The generating the first feature information may include applying the first deep neural network model to the pixel color values of the 2D image to generate a feature associated with an appearance of the user face.

The generating the second feature information may include applying the second deep neural network model to the 3D shape information to generate a feature associated with a shape of the user face.

The processor may be configured to execute computer-readable instructions to normalize the image based on at least one of the one or more detected landmarks and the personalized 3D face model.

At least one example embodiment relates to a face recognition apparatus.

In at least one example embodiment, a face recognition apparatus may include: a memory storing computer-readable instructions; and a processor configured to execute the computer-readable instructions to: generate a personalized three-dimensional (3D) face model based on a two-dimensional (2D) input image of a user face; generate 3D shape information based on the personalized 3D face model, the 3D shape information including one or more sets of 3D surface coordinate values; generate a normalized 2D input image of the user face based on the personalized 3D face model; generate feature information associated with the user face, based on the 3D shape information and pixel color values of the normalized 2D input image; determine whether the user face included in the 2D input image correlates with a stored 2D image of an enrolled user face, based on determining whether the feature information associated with the user face correlates with feature information associated with the enrolled user face; and generate an unlocking command signal to enable user access to at least a portion of a terminal device, based on determining that the user face included in the 2D input image correlates with the stored 2D image of the enrolled user face.

The processor may be configured to execute the computer-readable instructions to: generate first feature information based on applying a first deep neural network model to the pixel color values of the normalized 2D input image; generate second feature information based on applying a second deep neural network model to the 3D shape information of the personalized 3D face model; and generate final feature information based on the first feature information and the second feature information; and determine whether the user face included in the 2D input image correlates with a stored 2D image of an enrolled user face, based on determining whether the final feature information correlates with the feature information associated with the enrolled user face.

The processor may be configured to execute computer-readable instructions to: generate a depth image of the user face based on the personalized 3D face model, the depth image including a 3D shape associated with the user face; adjust the 3D shape based on the normalized 2D input image of the user face; and generate the 3D shape information from the adjusted 3D shape.

BRIEF DESCRIPTION OF THE DRAWINGS

The foregoing and other features of inventive concepts will be apparent from the more particular description of non-limiting embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings:

FIG. 9A and FIG. 9B illustrate examples of determining second feature information based on landmarks of a face according to at least one example embodiment;

DETAILED DESCRIPTION

Figure 1:
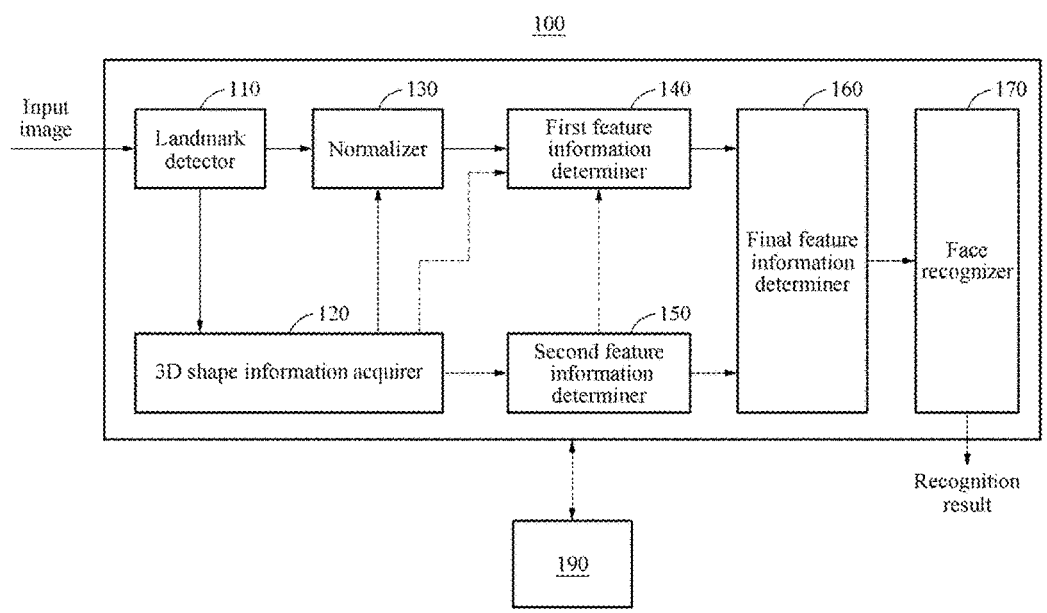
FIG. 1 illustrates an example of a face recognition apparatus according to at least one example embodiment.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may not be repeated.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first", "second", etc. may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an etched region or an implanted region illustrated as a rectangle may have rounded or curved features. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Various example embodiments will now be described more fully with reference to the accompanying drawings in which at least one example embodiment are shown. In the drawings, the thicknesses of layers and regions are exaggerated for clarity.

FIG. 1 illustrates a face recognition apparatus 100 according to at least one example embodiment. As shown in FIG. 1, the face recognition apparatus 100 may be communicatively coupled ("connected") to a terminal device 190. The terminal device 190 may include one or more user interfaces. In at least one example embodiment, the face recognition apparatus 100 may include a landmark detector 110, a three-dimensional (3D) shape information acquirer 120, a normalizer 130, a first feature information determiner 140, a second feature information determiner 150, a final feature information determiner 160, and a face recognizer 170. The landmark detector 110, the 3D shape information acquirer 120, the normalizer 130, the first feature information determiner 140, the second feature information determiner 150, the final feature information determiner 160, and the face recognizer 170 may perform operations through at least one processor.

In at least one example embodiment, one or more of the elements of apparatus 100 may be software modules implemented by one or more processors in cooperation with one or more memory devices. In at least one example embodiment, the apparatus includes one or more memories and one or more processors that are interoperable with the one or more memories to implement one or more of the elements of the apparatus 100 FIG. 1.

Hereinafter, a face recognition procedure and a learning procedure will be explained separately with reference to the following descriptions.

Descriptions related to the face recognition procedure are provided based on an example below.

The face recognition apparatus 100 may receive a two-dimensional (2D) input image that includes an image of a face of a user ("user face"). The apparatus 100 may recognize a face of a user appearing in a 2D input image. The 2D input image may be a 2D image acquired by a camera device. The camera device may include, for example, one or more of a digital still camera and a video camera. In at least one example embodiment, the apparatus 100 includes the camera device. In at least one example embodiment, the apparatus 100 receives the 2D input image from a camera device that is external to the apparatus 100.

The face recognition apparatus 100 may determine whether the user appearing in the 2D input image is the same as a user included in a desired (and/or, alternatively, predetermined) enrollment image. Such determination may include determining whether the user face included in the 2D input image correlates with a stored 2D image of an enrolled user face. An enrollment image may be stored in a database. The database may be included in a memory. The memory may be included in the apparatus 100. The enrollment image may be generated based on an enrollment process before face recognition is performed. The enrollment image may include a face image of at least one user.

The face recognition apparatus 100 may be utilized in various application areas, for example, a monitoring/security system, a mobile device authentication, and multimedia search and classification. Also, the face recognition apparatus 100 may be used to implement a complex biometric authentication system through a combination with a fingerprint recognition apparatus. Hereinafter, for ease and convenience of descriptions, it is assumed that a 2D input image includes one face area. However, the present disclosure is not limited thereto. A "face area" may include an area ("portion") of a 2D input image that is occupied by a user face.

The 2D input image may be input to the landmark detector 110 to perform the face recognition. For example, a 2D input image including a partial or whole area of the face may be input to the landmark detector 110. The 2D input image may be a color image or a black-and-white image. The landmark detector 110 may detect a face area from the 2D input image and detect facial landmarks from the detected face area. The landmark detector 110 may detect landmarks from the 2D input image using, for example, an active appearance model (AAM), an active shape model (ASM), a supervised descent method (SDM), and a deep learning.

A facial "landmark," also referred to as a facial "feature," may include a set of one or more feature points in the face area, where the set of one or more feature points indicate a boundary or interface between different surfaces or elements of the face area. A landmark may include a set of one or more feature points that define a facial macro-feature of the face area. For example, a landmark may include a set of points on the face area that define a nose, lips, an eye, an ear, an eyebrow, some combination thereof, or the like. The landmarks may indicate feature points located in, for example, an eyebrow, an eye, a nose, a mouth, a chin, an ear, and a contour of the face.

The 3D shape information acquirer 120 may restore a 3D shape of the face of the user included in the 2D input image. "Restoring" a 3D shape of a face included in a 2D input image may include generating a 3D model of the face ("3D face model"). The 3D face model may be generated based on modifying surface coordinates of a generic 3D face model using feature point coordinates determined from the detected "landmarks" of the 2D input image, such that the 3D shape of the face corresponds to the 2D representation of the face in the 2D input image. As referred to herein, "3D shape information" may include 3D coordinates (e.g., x,y,z coordinates) of one or more surfaces comprising a 3D face model.

The 3D shape information acquirer 120 may generate a personalized 3D face model by applying the landmarks detected from the 2D input image to a generic 3D face model. A personalized 3D face model may be used to generate one or more of a normalized 2D image of the user face, a normal image of the user face, and a depth image of the user face. The 3D shape information acquirer 120 may generate the personalized 3D face model by mapping the landmarks detected from the 2D input image to landmark points of the generic 3D face model.

The generic 3D face model may be, for example, a deformable 3D face model generated based on learning data, and may also be referred to as a 3D standard model. The generic 3D face model may be configured with a 3D shape and a texture, and may include parameters for expressing the 3D shape.

In at least one example embodiment, the personalized 3D face model may be generated by applying a shape variation based on landmark detection information to an average shape of the generic 3D face model as shown in Equation 1. "Applying a shape variation" to an average shape of the generic 3D face model may include adjusting 3D surface coordinates of the 3D face model according to the detected landmarks of the 2D input image to generate a 3D face model that corresponds to the face represented in the 2D input image. In Equation 1, a personalized 3D face model is generated based on calculating a sum of shape variations and applying the sum to the shape elements of the generic 3D face model.

$$\overline{S} = \overline{S}_0 + \sum_i \overline{p}_i \overline{S}_i \quad \text{[Equation 1]}$$

In Equation 1, $\overline{S}_0$ denotes shape elements expressing the average shape of the generic 3D face model. $\overline{S}_i$ denotes a shape element corresponding to an index i, and $\overline{p}_i$ denotes a shape control parameter applied to $\overline{S}_i$. A weighted sum of $\overline{p}_i$ and $\overline{S}_i$ indicates the shape variation. A shape variation may be a product of one or more 3D surface coordinates of a separate shape element of the 3D shape model with a calculated shape control parameter. A shape element may be a set of 3D coordinates of one or more surfaces of the 3D face model (also referred to herein as "3D surface coordinates"). The set of 3D coordinates may be transposed, and each shape element "S" may be a set of transposed 3D coordinates of one or more surfaces of the 3D face model. As shown in equation 2, below each set of x, y, z coordinate values for a given index is a separate 3D coordinate included in a shape element. A shape control parameter "p" may include information indicating a magnitude and direction of a change to one or more of the 3D surface coordinates comprising a shape element. The magnitude and direction of the change to one or more 3D surface coordinates may be determined based on detected landmarks in the 2D input image. For example, a shape control parameter may be calculated based on the set of feature points included in a detected landmark in the 2D input image. The 3D shape information acquirer 120 may calculate the shape control parameter based on landmark detection information of the 2D input image, and transform the generic 3D face model to the personalized 3D face model by applying the shape variation to the average shape. $\overline{S}$ denotes shape elements configuring the 3D shape of the personalized 3D face model. $\overline{S}$ may include surface coordinates of 3D points as shown in Equation 2.

$$\overline{S} = (\overline{x}_0, \overline{y}_0, \overline{z}_0, \overline{x}_1, \overline{y}_1, \overline{z}_1, \ldots, \overline{x}_v, \overline{y}_v, \overline{z}_v)^T \quad \text{[Equation 2]}$$

In Equation 2, $\overline{v}$ denotes an index for identifying spatial positions $\overline{x}$, $\overline{y}$, and $\overline{z}$ indicate x, y, and z coordinates, respectively, of surface vertices of one or more portions of the personalized 3D face model, and T denotes a transpose. The 3D shape information acquirer 120 may acquire ("generate") 3D shape information based on position information of the vertices configuring the personalized 3D face model. The 3D shape information may include 3D coordinates (e.g., x, y, z coordinates) of one or more surfaces comprising a 3D face model. The 3D shape information may indicate information on the 3D shape of the face of the user. The 3D shape information may include, for example, shape parameter information for expressing a facial shape of the user and depth information of the facial shape of the user.

In at least one example embodiment, a personalized 3D face model may be used to generate a normalized 2D image, a normal image, and/or a depth image. A normal image may be an image representing surface normal information, where the surface normal information indicates a normal feature of a facial surface. The normal feature is associated with a normal vector indicating a direction of at least one facial surface on the user face. As described herein, a direction of a surface refers to a direction that is normal to a plane of the surface. The surface normal information may include information associated with a normal vector, where the normal vector indicates a direction of at least one facial surface on the face of the user. Thus, the surface normal information may include information on normal vectors that collectively indicate the directions of each facial surface on the user face. As referred to herein, "normal" may indicate an object, including a line or vector, which is perpendicular to a given object. A normal vector, sometimes referred to herein as a "normal," is a vector to an object that is perpendicular to the object (e.g., a surface) at a given point.

In at least one example embodiment, the 3D shape information acquirer 120 may generate a depth image using the personalized 3D face model. The acquirer 120 may extract the 3D shape information of the face of the user from the depth image. As an example, the 3D shape information acquirer 120 may convert a pose of the personalized 3D face model to a frontal face pose. In this example, the 3D shape information acquirer 120 may convert a depth value to a value between 0 and 255 and generate the depth image. Additionally, to acquire more accurate 3D shape information matching a texture shape of the 2D input image, the 3D shape information acquirer 120 may refine the 3D shape appearing in the depth image based on the landmarks detected from the 2D input image, and acquire the 3D shape information from the refined 3D shape of the depth image. Related descriptions will be also provided with reference to FIGS. 3A and 3B.

In another example, the 3D shape information acquirer 120 may generate a normal image of the face using the personalized 3D face model. The normal image may include surface normal information indicating a normal feature of a facial surface. The surface normal information may include information on a normal vector indicating a direction of each facial surface on the face of the user. The 3D shape information acquirer 120 may extract the 3D shape information of the face of the user from the normal image.

In still another example, the 3D shape information acquirer 120 may acquire the 3D shape information from a depth image photographed by, for example, a depth camera and a 3D camera. Here, the depth image may include depth information indicating a distance between a camera and the face. The 3D shape information acquirer 120 may extract the 3D shape information of the face from the depth information of the depth image.

As such, the 3D shape information acquirer 120 may acquire the 3D shape information using, for example, the depth image, a normal image, a depth camera, and a 3D camera. However, the present disclosure is not limited thereto. Acquiring ("generating") a normalized 2D image may include generating a 2D image based on a 2D projection of a normalized view of the personalized 3D face model. A normalized view of a personalized 3D face model may be a view of the personalized 3D face model that corresponds with a represented view of a user face in an enrollment image. A normalized 2D image may be generated based on generating a 2D projection of a normalized view of the personalized 3D face model.

A face area size and a face pose represented in the 2D input image may differ from a face area size and a face pose represented in an enrollment image. The enrollment image may be a target to be compared to the 2D input image. The normalizer 130 may perform normalization on the 2D input image such that the face area sizes and facial component positions of the 2D input image and the enrollment image are aligned. Aligning the 2D input image and the enrollment image may include adjusting the size and orientation of the personalized 3D face model to adjust the size and orientation of the user face in a 2D projection of the personalized 3D face model to match or substantially match the size and orientation of the user face in the enrollment image. As a result, the normalized 2D image may have the same face area and face size as the enrollment image. Facial components may include, for example, an eye, an eyebrow, a nose, a mouth, and an ear. Facial components represented in an image may be at least partially identified based on facial landmarks detected in the image. The normalizer 130 may adjust the face pose in the 2D input image or adjust the facial component position of the input image to correspond to the facial component position of the enrollment image. As an example, the normalizer 130 may perform the normalization by applying an affine transformation based on the landmark detection information of the 2D input image. The affine transformation may be, for example, a transformation performed to match a vector space to another vector space.

In at least one example embodiment, the normalizer 130 may generate a normalized 2D input image using the personalized 3D face model. Generating a normalized 2D input image may include generating a 2D image based on a 2D projection of a normalized view of the personalized 3D face model. The normalized view may be generated based on generating a view along a desired (and/or alternatively, desired (and/or, alternatively, predetermined)) normal vector associated with a front side of the personalized 3D face model. The 3D shape information acquirer 120 may estimate pose information of a frontal face using the personalized 3D face model. The normalizer 130 may normalize the 2D input image based on the pose information of the frontal face using the personalized 3D face model. The pose information of the frontal face may include, for example, information on a face area size obtained by converting a pose of the personalized 3D face model to a frontal face pose, and information on spatial positions of facial components. Pose information may include information indicating an orientation of the personalized 3D face model relative to a reference orientation. The orientation of the personalized 3D face model may be based on a normal vector of a surface of the 3D face model. Also, the normalizer 130 may perform the normalization using a 2D projection image acquired using the personalized 3D face model.

The first feature information determiner 140 may determine first feature information based on 2D image information of the normalized 2D input image. The 2D image information may include, for example, color information, intensity information, and texture information of the 2D input image. The 3D image information may include pixel values of one or more pixels of the 2D image. Pixel values may include color values, depth values, brightness values, intensity values, some combination thereof, or the like. The first feature information determiner 140 may determine the first feature information by inputting the 2D image information of the normalized 2D input image to a first neural network model learned in advance.

In at least one example embodiment, the determiner 140 may generate first feature information which indicates color, brightness, and intensity values for the pixels of the normalized 2D input image.

In at least one example embodiment, the first feature information determiner 140 may determine a feature vector for expressing an appearance of the face by performing a convolution on the normalized 2D input image using a convolutional neural network model. Performing a convolution on the 2D input image may include applying the convolutional neural network model to the normalized 2D input image to generate ("determine") a facture vector. The first feature information may be a feature vector. The first feature information determiner 140 may determine a value extracted from an uppermost layer of the first neural network model as the first feature information. Alternatively, the first feature information determiner 140 may determine the first feature information by connecting the value extracted from the uppermost layer and a value extracted from a hidden layer.

In another example, the first feature information determiner 140 may determine the first feature information by inputting, to the first neural network model, the depth information (e.g., pixel depth values) of the depth image generated by the 3D shape information acquirer 120 as well as the 2D image information (e.g., pixel color values) of the 2D input image.

The second feature information determiner 150 may determine second feature information based on the 3D shape information (e.g., 3D surface coordinate values, vectors, etc. of one or more surfaces of the personalized 3D face model). The second feature information determiner 150 may determine the second feature information by inputting the 3D shape information to a second neural network model learned in advance. As an example, the second feature information determiner 150 may convert the shape parameters configuring the personalized 3D face model to be in a form of a vector and input the vector to a neural network model in an auto-encoder structure, thereby determining a feature vector for expressing the shape of the face.

In at least one example embodiment, the second feature information determiner 150 may determine the second feature information by inputting the depth information of the depth image generated by the 3D shape information acquirer 120 to a third neural network model learned in advance. As an example, the second feature information determiner 150 may determine the second feature information by performing convolution on the depth image using the convolutional neural network model.

In another example, the second feature information determiner 150 may determine the second feature information based on a distance between the facial landmarks. The second feature information determiner 150 may configure a matrix database based on a distance between two landmarks among the landmarks detected from a face area. The determiner 150 may input the matrix database to a fourth neural network model, thereby extracting the second feature information associated with the shape of the face. Related descriptions will also be described with reference to FIGS. 9A and 9B.

In the foregoing, each of the first neural network model, the second neural network model, the third neural network model, and the fourth neural network model may be, for example, a deep neural network model including a plurality of hidden layers.

The final feature information determiner 160 may determine final feature information for the face recognition based on the first feature information and the second feature information. The final feature information may be expressed by the feature vector. The final feature information determiner 160 may determine the final feature information by, for example, concatenating simply the first feature information and the second feature information or connecting the first feature information and the second feature information through a fully connected layer.

In at least one example embodiment, a result extracted from the second feature information determiner 150 may be input to the first feature information determiner 140 in lieu of the final feature information determiner 160. The first feature information determiner 140 may extract feature information using the result transmitted from the second feature information determiner 150 as an additional input. The final feature information determiner 160 may determine the feature information extracted from the first feature information determiner 140 to be the final feature information. As an example, the result extracted from the second feature information determiner 150 may be additionally input to a hidden layer in the first neural network model of the first feature information determiner 140, and the feature information may be output from an output layer of the first neural network model. The final feature information determiner 160 may determine the feature information output from the first neural network model to be the final feature information.

The face recognizer 170 may perform the face recognition based on the final feature information. The face recognizer 170 may determine a face recognition result by comparing the final feature information of the 2D input image to feature information of the enrollment image to determine whether the final feature information of the 2D input image correlates with the feature information of the enrollment image. The face recognizer 170 may calculate a similarity between the final feature information of the 2D input image and the feature information of the enrollment image using, for example, a principal component analysis (PCA) scheme, a linear discriminate analysis (LDA) scheme, and a Joint Bayesian scheme. Subsequently, the face recognizer 170 may determine the face recognition result by determining whether the calculated similarity satisfies a desired (and/or, alternatively, predetermined) condition.

When the similarity satisfies the desired (and/or, alternatively, predetermined) condition (e.g., the user face included in the 2D input image is determined to correlate with the stored 2D image of the enrolled user face), the face recognizer 170 may determine that the face recognition succeeds. Based on such a determination, the face recognition apparatus 100 may generate an unlocking command signal. The unlocking command signal may include a signal that includes information indicating that the user matches or substantially matches ("correlates") with the enrolled user. Where the facial recognition is associated with granting access of an element (e.g., a room, file, etc.) to the user (e.g., unlocking access to a file, room, etc.) the unlocking command signal may include a command to grant user access to the element. When the similarity does not satisfy the desired (and/or, alternatively, predetermined) condition, the face recognizer 170 may determine that the face recognition fails.

In at least one example embodiment, in response to a determination that the face recognition succeeds, the face recognition apparatus 100 may unlock a terminal device 190 connected to the face recognition apparatus 100 or assign a right to access a desired (and/or, alternatively, predetermined) function of the terminal device 190 to the user. In at least one example embodiment, in response to a determination that the face recognition succeeds, the face recognition apparatus may generate an unlocking command signal that includes a command to unlock a terminal device 190 communicatively coupled to the face recognition apparatus 100. Unlocking a terminal device 190 may include commanding the terminal device 190 to enable user access to at least a portion of the terminal device 190 through user interaction with one or more user interfaces of and/or coupled to the terminal device 190. In at least one example embodiment, in response to a determination that the face recognition succeeds, the face recognition apparatus may generate an unlocking command signal that includes a command to assign a right to access a desired (and/or, alternatively, predetermined) function of the terminal device 190 to the user. In response to a determination that the face recognition fails, the face recognition apparatus 100 may maintain a locked state of the terminal device 190 or restrict the right to access the desired (and/or, alternatively, predetermined) function of the terminal device 190.

In a process of generating feature information for the face recognition, an accuracy on the face recognition may be enhanced by applying the 3D shape of the face of the user in addition to image information of the 2D input image. The first feature information determined based on the 2D image information of the 2D input image may correspond to a feature vector of a global or local texture of the face, and the second feature information determined based on the 3D shape information of the personalized 3D face model may correspond to a feature vector of the 3D face shape. The final feature information for the face recognition may be generated by combining the feature vector of the global or local texture of the face and the feature vector of the 3D shape of the face. By performing the face recognition based on the final feature information, the face recognition may have robustness to a change in a lighting environment, a face pose, a facial expression, an occlusion, and the like of the 2D input image. As an example, in response to a change in intensity of the input image, a feature related to the appearance of the face may be changed. In this example, a face recognition accuracy may be enhanced by additionally applying a feature related to the 3D shape of the face. As another example, when face appearances in images are similar to one another and 3D shapes of faces in the images differ from one another, features related to the face appearance may be similar to one another. In this example, the face recognition accuracy may also be enhanced by additionally applying a feature related to the 3D shape of the face.

Descriptions related to the learning procedure will be provided based on an example below.

Hereinafter, a procedure of learning at least one of the first neural network model, the second neural network model, and the third neural network model using a learner (not shown) will be described as follows. Through the learning procedure, performances of neural network models used for the face recognition may be enhanced and thus, the accuracy on the face recognition may also increase.

When a 2D learning image for learning is input to the learner, the learner may detect a landmark of a face from the 2D learning image. Subsequently, the learner may generate a personalized 3D face model based on the detected landmark and extract 3D shape information from the personalized 3D face model. Also, the 2D learning image may be normalized such that positions of facial components are adjusted. Since the aforementioned descriptions provided based on an example of the face recognition procedure are also applicable here, repeated descriptions will be omitted for increased clarity and conciseness.

When a neural network model corresponding to a learning target is a convolutional neural network model, the 2D learning image and identification information corresponding to the 2D learning image may be input or two images to be compared to one another and information indicating whether users appearing in the two images are the same may be input. When the neural network model corresponding to the learning target is the auto-encoder structured neural network model, shape parameters configuring a 3D face model may be input through a conversion into a form of a vector.

The learner may use, for example, a backpropagation learning scheme for learning the neural network model. The backpropagation learning scheme may be a scheme for estimating an error in the learning data through a forward computation, propagating the estimated error in a backward direction, starting from an output layer of the neural network model through the hidden layer to an input layer, and updating a connection weight of artificial neurons to reduce the error.

Figure 2:
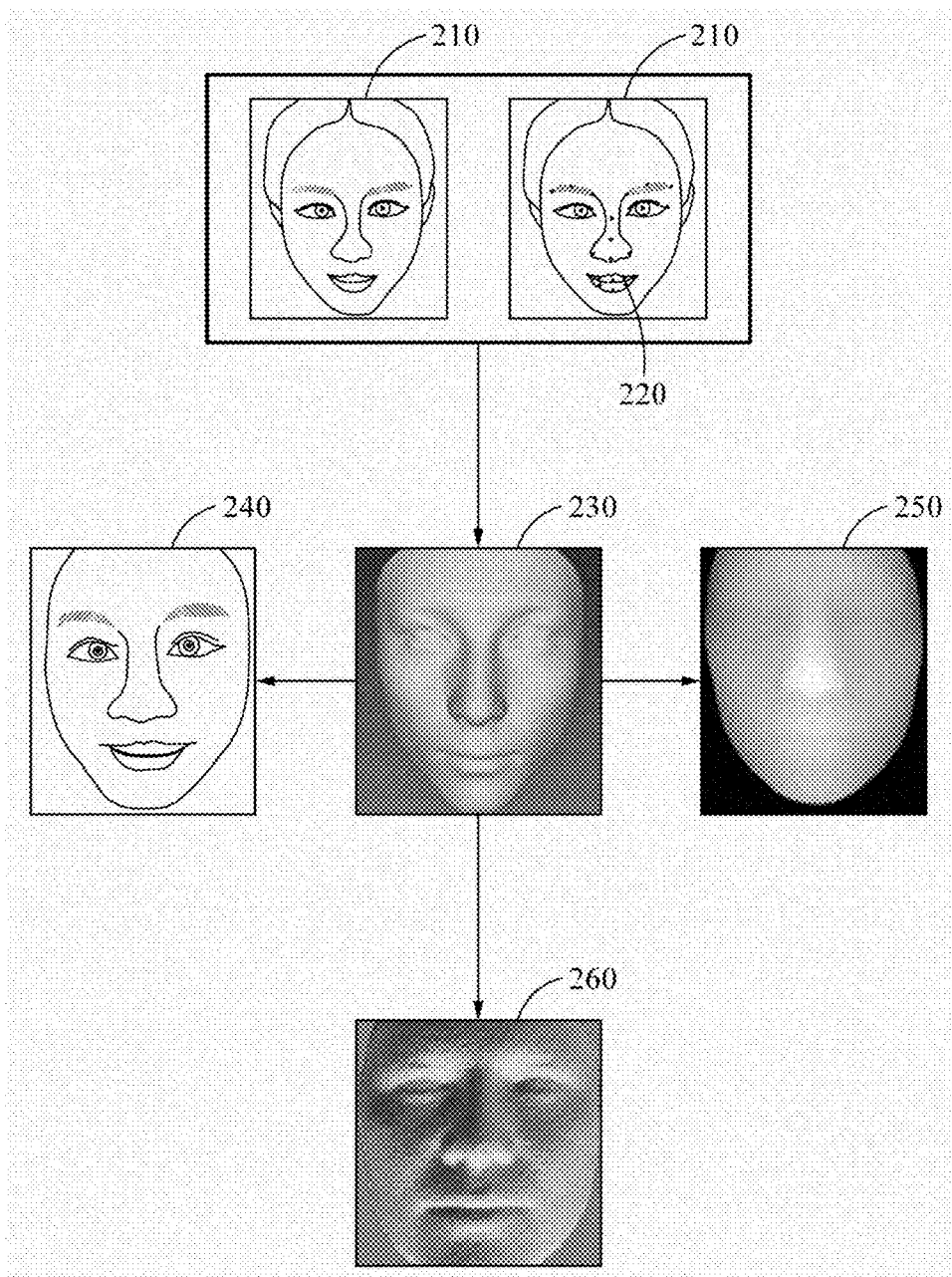
FIG. 2 illustrates an example of restoring a three-dimensional (3D) shape of a face of a user according to at least one example embodiment.

FIG. 2 illustrates an example of restoring a 3D shape of a face of a user according to at least one example embodiment. The face recognition apparatus 100 may detect a face area from an image 210, and detect facial landmarks, for example, a landmark 220 positioned at an eyebrow, an eye, a nose, a mouth, and the like of the face. The image 210 may be a 2D input image. The face recognition apparatus 100 may apply landmark detection information to a generic 3D face model to restore a 3D shape of a face of a user appearing in the image 210. As an example, the face recognition apparatus 100 may determine shape control parameters for transforming a shape of the generic 3D face model based on a position of the landmark 220, apply the determined shape control parameters to the generic 3D face model, thereby generating a personalized 3D face model 230 representing a 3D shape of the face of the user.

The face recognition apparatus 100 may generate a 3D texture model 230, also referred to herein as a personalized 3D face model 230, by mapping a texture extracted from the image 210 to a generic 3D face model. A texture may include one or more facial landmarks 220, 2D input image 210 pixel values, some combination thereof, or the like. Mapping a texture extracted from the image 210 to the personalized 3D face model may include applying the pixel values of the face area in the input 2D image onto corresponding portions of the surface of the 3D face model. Mapping a texture extracted from the image 210 to the personalized 3D face model may include generating a personalized 3D face model 230 based on detected landmarks 220 in the 2D input image. The face recognition apparatus 100 may adjust a face pose ("orientation," "vector," etc.) of a 3D texture model and project the 3D texture model onto a 2D plane, thereby generating a normalized 2D input image 240. First feature information may be determined based on the normalized 2D input image 240. The face recognition apparatus 100 may generate at least one of a depth image 250 and a normal image 260 based on 3D coordinate information of points, vertices, surfaces, etc. comprising the personalized 3D face model 230. Alternatively, the face recognition apparatus 100 may generate a combination image by combining the depth image 250 and the normal image 260 using the personalized 3D face model 230.

Figure 3A:
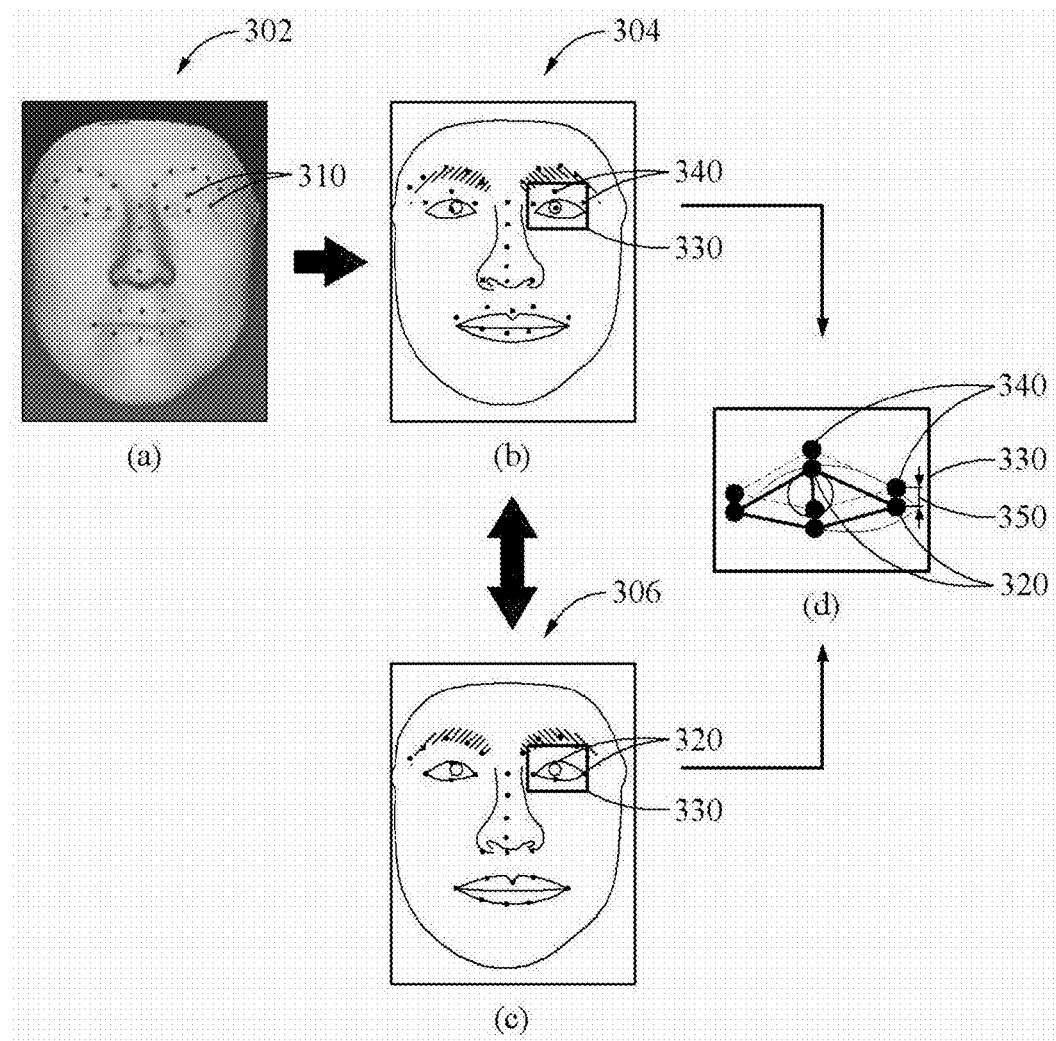
FIG. 3A and FIG. 3B illustrate an example of refining a 3D shape appearing in a depth image according to at least one example embodiment.
Figure 3B:
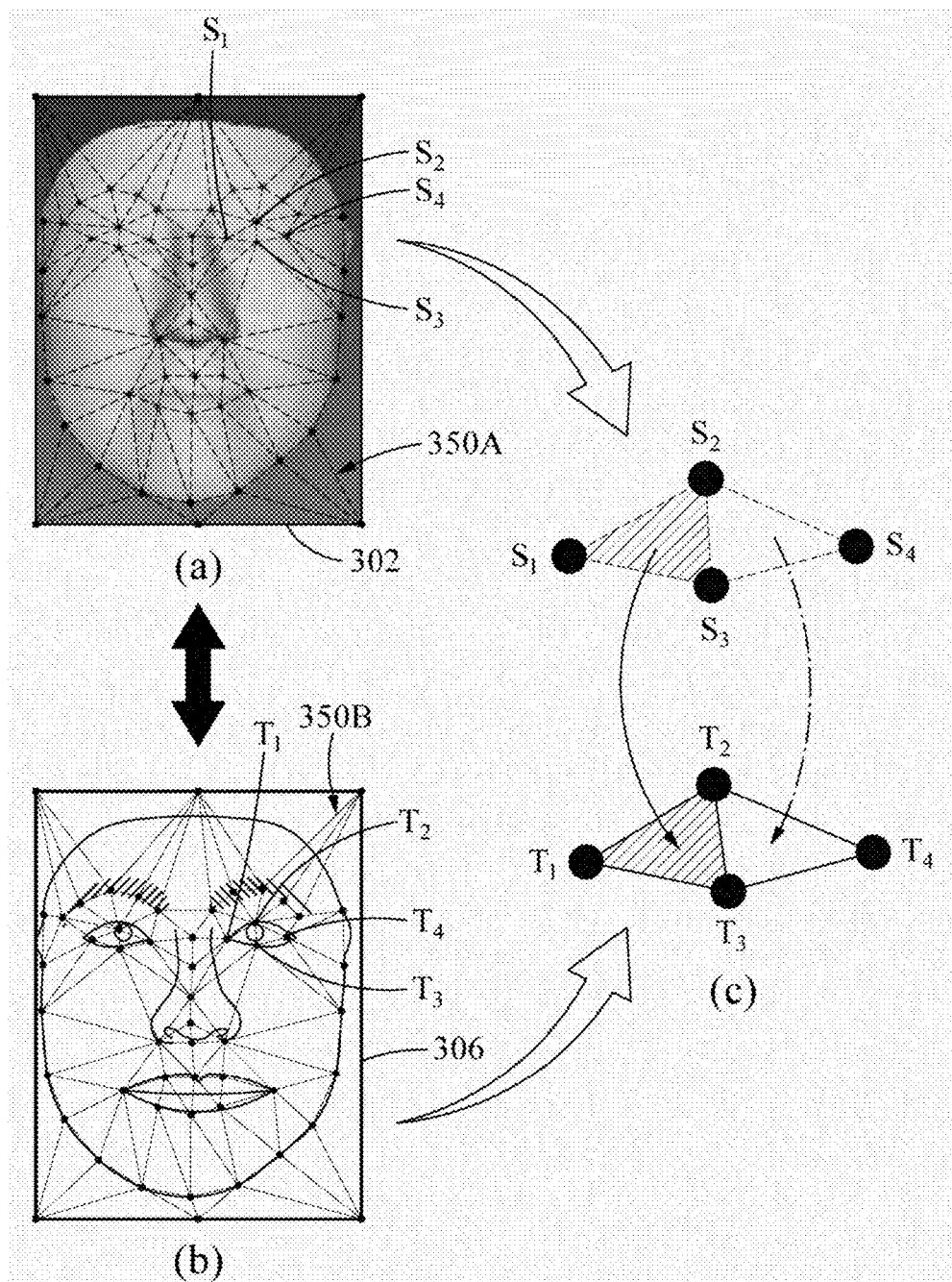

FIGS. 3A and 3B illustrate an example of refining a 3D shape appearing in a depth image.

Referring to FIG. 3A, a part (a) illustrates landmarks 310 acquired from a depth image 302. The depth image 302 may be generated based on a personalized 3D face model. If and/or when the depth image 302 is generated based on the personalized 3D face model, positions of landmarks 310 in the depth image 302 may be determined based on positions of landmarks included in the personalized 3D face model.

Part (b) shown in FIG. 3A may be a result obtained by applying landmarks 310 of the depth image 302 to a normalized 2D input image 304. Thus, in part (b), landmarks 340 are included in the normalized 2D input image 304. A part (c) illustrates landmarks 320 of the normalized 2D input image 306. The normalized 2D input image 306 may be the same as the normalized 2D input image to which the landmarks 310 are applied to generate the normalized 2D input image 304. A part (d) illustrates a positional relationship between the landmarks 320 and 340 appearing in a same region 330 of the part (b) and the part (c). As shown in FIG. 3A, a positional error 350 may be determined based on the positional relationship between the landmarks 340 of the depth image applied ("mapped") to the normalized 2D image 304 shown in part (b) and corresponding landmarks 320 of the normalized 2D input image 306 shown in part (c). The positional error 350 may thus be an error between the landmarks 340 of the depth image applied ("mapped") to the normalized 2D image 304 shown in part (b) and corresponding landmarks 320 of the normalized 2D input image 306 shown in part (c).

To acquire more accurate 3D shape information by compensating for the positional error 350, the face recognition apparatus 100 may refine a 3D shape, for example, depth information (e.g., pixel depth values), appearing in the depth image 302 based on positions of landmarks 320 in a normalized 2D input image 304. Referring to FIG. 3B, the face recognition apparatus 100 may form one or more meshes 350A based on landmarks 310 of a depth image 302 as shown in a part (a), and form meshes 350B based on landmarks of a normalized 2D input image 306 as shown in a part (b). In at least one example embodiment, the face recognition apparatus 100 may form meshes 350A-B based on reference points located on a boundary of an image and a contour of a face. However, the present disclosure is not limited thereto.

The face recognition apparatus 100 may adjust a 3D shape appearing in the depth image 302 based on a corresponding relationship between the meshes 350A-B formed based on the landmarks of the depth image and the meshes formed based on the landmarks of the normalized 2D input images. As shown in the part (c) of FIG. 3B, the face recognition apparatus 100 may perform an affine transformation on the meshes 350A formed using landmarks S1, S2, and S3 of the depth image 302. The face recognition apparatus 100 may perform the affine transformation on the meshes 350A based on the meshes 350B formed using the landmarks T1, T2, and T3 of the normalized 2D input image 306, thereby adjusting a position of one or more pixel depth values of the depth image 302. Here, the meshes 350A formed in the depth image 302 and the meshes 350B formed in the normalized 2D input image 306 may correspond to one another. Similarly, the face recognition apparatus 100 may adjust the depth values of the depth image 302 based on a corresponding relationship between the meshes 350A formed using landmarks S1, S2, and S3 of the depth image 302 and the meshes 350B formed using the landmarks T1, T2, and T3 of the normalized 2D input image 306.

The face recognition apparatus 100 may perform the foregoing procedure to all meshes 350A of the depth image in part (a) of FIG. 3B and adjust the 3D shape of the depth image 302 to match a texture shape appearing in the normalized 2D input image 306. The face recognition apparatus 100 may acquire 3D shape information from the depth image on which a refinement is performed, and perform face recognition based on the acquired 3D shape information and color information of the normalized 2D input image. Through the refinement, the 3D shape appearing in the depth image may match the texture shape appearing in the normalized 2D input image, thereby determining the more accurate feature information.

Refining a 3D shape may include adjusting a shape of a depth image (e.g., adjusting depth image pixel values, 3D model surface coordinates, etc.) to compensate for a positional error 350. Refining a 3D shape may include adjusting the shape of the depth image to compensate for differences between a mesh of the depth image and a mesh of the normalized 2D image. For example, the pixel values of the depth image may be adjusted so that the positional error between a feature of the depth image and a corresponding feature of the normalized D input image is reduced and/or mitigated.

Figure 4:
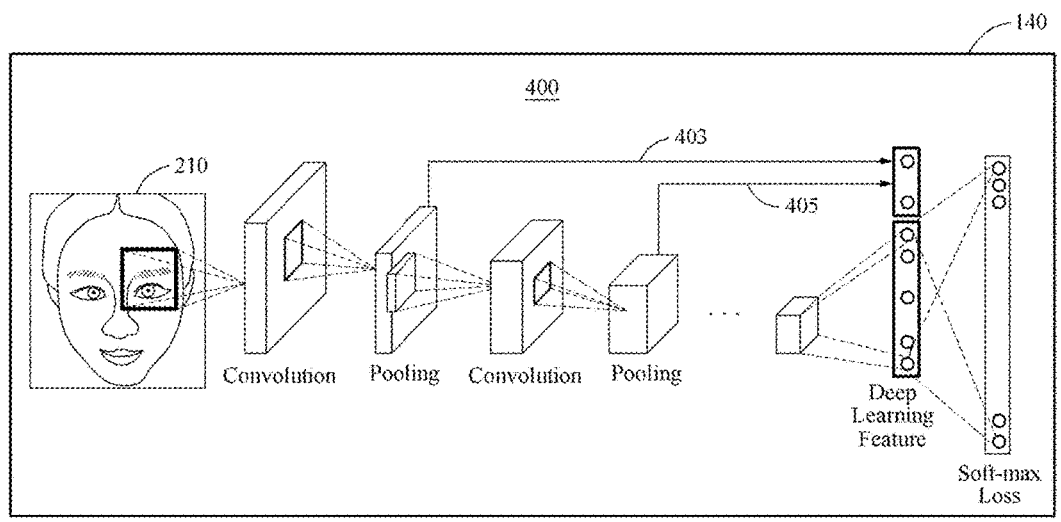
FIG. 4 and FIG. 5 illustrate examples of determining first feature information based on a first neural network model according to at least one example embodiment.
Figure 5:
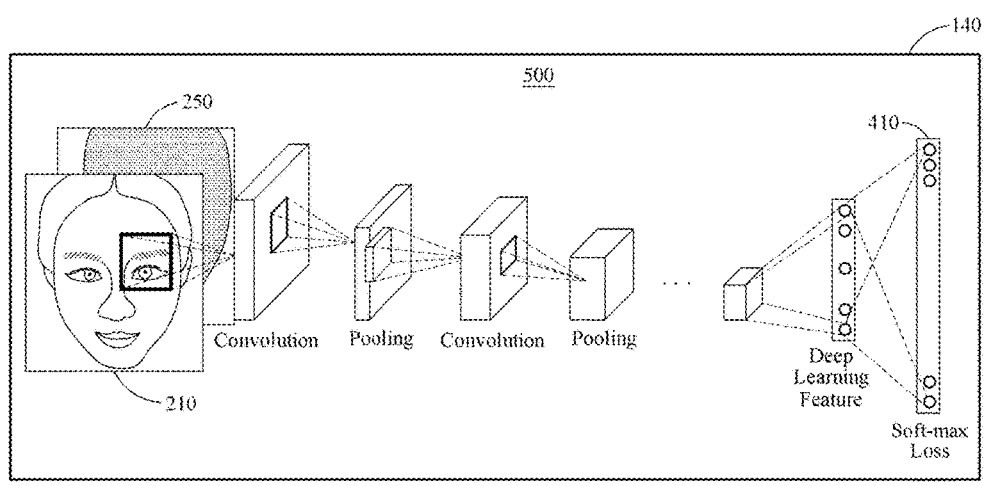

FIGS. 4 and 5 illustrate examples of determining first feature information based on a first neural network model according to at least one example embodiment. In at least one example embodiment, a convolutional neural network model may be used as a first neural network model. In the convolutional neural network model, each layer may include a feature map extracted from upper layers. The convolutional neural network model may include a feature map extracted through a convolution and another feature map obtained by subsampling the feature map.

Referring to FIG. 4, the face recognition apparatus 100 may include a first feature information determiner 140 that may determine ("generate") first feature information 410 by inputting 2D image information (e.g., pixel color values) of the 2D input image 210 to a convolutional neural network model 400. The image 210 may be normalized, and then the normalized 2D input image may be input to the convolutional neural network model 400. Thus, a face area size and positions of face components may be adjusted in the image 210. First feature information may be generated by model 400 based on applying a neural network model to the pixel values of the input 2D image of the user face.

The first feature information determiner 140 may determine a value extracted 403 from an uppermost layer of the convolution network model 400 to be the first feature information 410. Alternatively, the face recognition apparatus 100 may determine the first feature information by connecting the value extracted 403 from the uppermost layer and a value extracted 405 from a hidden layer of the convolutional neural network model 400.

In a learning procedure, the face recognition apparatus 100 may input a learning image and identification (ID) information (e.g., "landmark" information) corresponding to the learning image to the convolutional neural network model 400. Also, the face recognition apparatus 100 may input two images to be compared to one another and output information indicating whether users appearing in the two images are the same. The face recognition apparatus 100 may perform deep learning on the convolutional neural network model 400 using a learning scheme based on identification loss and verification loss. The deep learning may indicate learning of a deep neural network model.

In at least one example embodiment, as illustrated in FIG. 5, the first feature information determiner 140 may determine first feature information 410 by inputting, to a convolutional neural network model 500, depth information (e.g., pixel depth values) of the depth image 250 in addition to 2D image information, for example, color information (e.g., pixel color values), of the normalized 2D input image 210 or a normalized image. Here, the depth image 250 may be acquired from a personalized 3D face model, and also be acquired by a depth camera or a 3D camera. The depth information of the depth image 250 may be used as additional channel information for generating the first feature information. First feature information may be generated by convolutional neural network model 500 based on applying a neural network model to the depth values of a depth image of the user face, in combination with pixel values of a 2D image of the user face, where the 2D image may be at least one of the 2D input image and the normalized 2D input image.

In at least one example embodiment, the convolutional neural network model 500 utilizes both 1) at least one of the normalized 2D input image of the user face and a 2D input image of the user face, and 2) a depth image of the user face to generate first feature information. In at least one example embodiment, the convolutional neural network model 400 utilizes the 2D input image of the user face and/or the normalized 2D input image of the user face to generate first feature information.

In at least one example embodiment, the convolutional neural network model 500 may refrain from generating first feature information by connecting a value extracted from the uppermost layer and a value extracted from a hidden layer of the convolutional neural network model 500.

In another example, the face recognition apparatus 100 may determine the first feature information 410 by inputting, to the convolutional neural network model 500, surface normal information of the normal image 260 as well as the 2D image information of the image 210. Here, the normal image 260 may be generated based on the personalized 3D face model.

Figure 6:
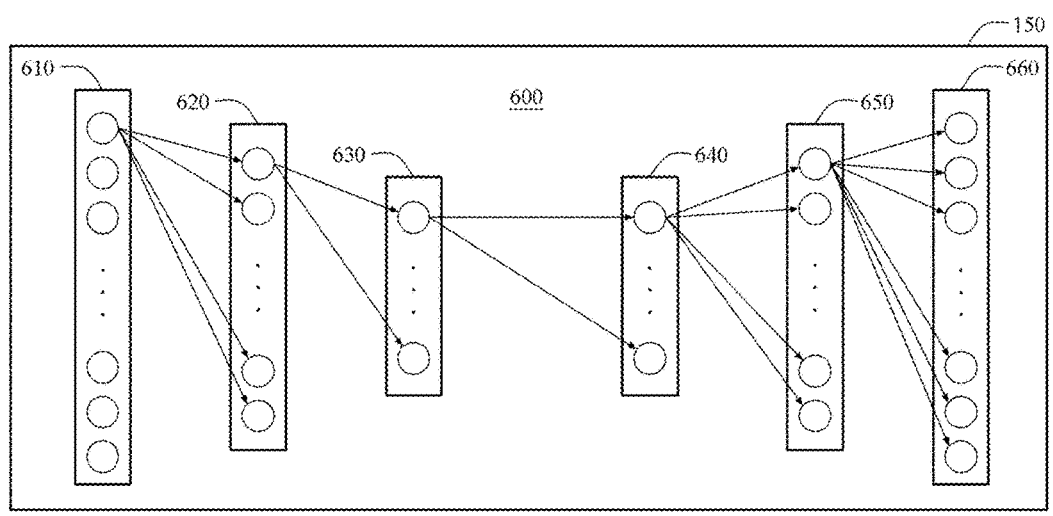
FIGS. 6 and 7 illustrate examples of determining second feature information based on a second neural network model according to at least one example embodiment.
Figure 7:
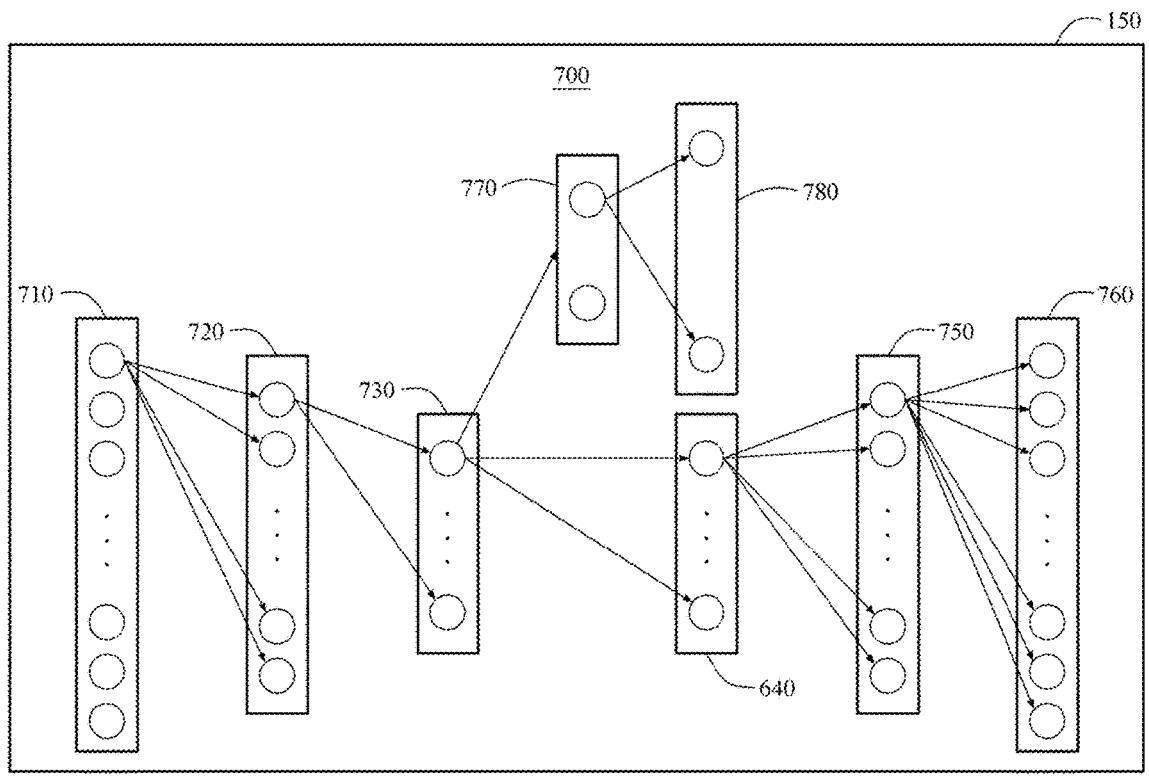

FIGS. 6 and 7 illustrate examples of determining second feature information based on a second neural network model according to at least one example embodiment. In at least one example embodiment, an auto-encoder structured neural network model may be used as the second neural network model. The auto-encoder structured neural network model may be, for example, a neural network model learned for equalizing a desired output to an input. In contrast to a convolutional neural network model, a neural network model 600 in an auto-encoder structure may be used to perform non-linear mapping on a feature that does not have a spatial relationship.

Referring to FIG. 6, the second feature information determiner 150 may include a neural network model 600. The neural network model 600 may include an encoding unit including an input layer 610 and encoding layers 620 and 630, and a decoding unit including decoding layers 640 and 650 and an output layer 660. The second feature information determiner 150 may convert shape parameters (e.g., 3D surface coordinates, algorithmic representations of one or more vertices, surfaces, etc. of a personalized 3D face model, etc.) acquired from a personalized 3D face model to be in a form of a vector and input a result of the converting to the neural network model 600. In the neural network model 600, the shape parameters converted to be in the form of the vector may be encoded using a fully connected layer through various operations, and then decoded through the same operations performed in the encoding. The face recognition apparatus 100 may determine the second feature information based on a value 621 output from an uppermost encoding layer 620 of the neural network model 600.

Although the aforementioned descriptions are provided based on an example in which the auto-encoder structured neural network model is used as the second neural network model, this disclosure is not limited thereto. Thus, various types of neural network models may be used as the second neural network model. For example, a neural network model transformed by eliminating the decoding unit from the auto-encoder structured neural network model may also be used as the second neural network model.

In a learning procedure, the face recognition apparatus 100 may generate a personalized 3D face model based on a learning image and convert shape parameters acquired from the personalized 3D face model to be in a form of a vector, thereby inputting a result of the converting to the neural network model 600. The face recognition apparatus 100 may perform deep learning on the neural network model 600 based on the auto-encoder structure. The face recognition apparatus 100 may calculate a loss between a final output value output from the decoding unit and a value input to the input layer 610 based on, for example, a Euclidean distance, and adjust a connection weight of neurons to reduce the calculated loss, thereby learning the neural network model 600.

FIG. 7 illustrates a neural network model 700 having an auto-encoder structure. The neural network model 700 may include an input layer 710, encoding layers 720 and 730, decoding layers 740 and 750, an output layer 760, and additional layers 770 and 780. In a learning procedure, the input layer 710 may receive ID information corresponding to a face of a user as well as shape parameter information through a conversion to a form of a vector. Also, the additional layers 770 and 780 may be used for learning the ID information to be mapped to the shape parameter information. A learning scheme based on a softmax loss may be applied in this example. ID information may include information associated with an identity of a person represented in an image, where the image may be a learning image used to a learning procedure. For example, where a learning image includes an image of a face of a user named "Tom," the ID information corresponding to the face in the learning image may be information indicating that the face is associated with a user identity of the user "Tom."

Figure 8:
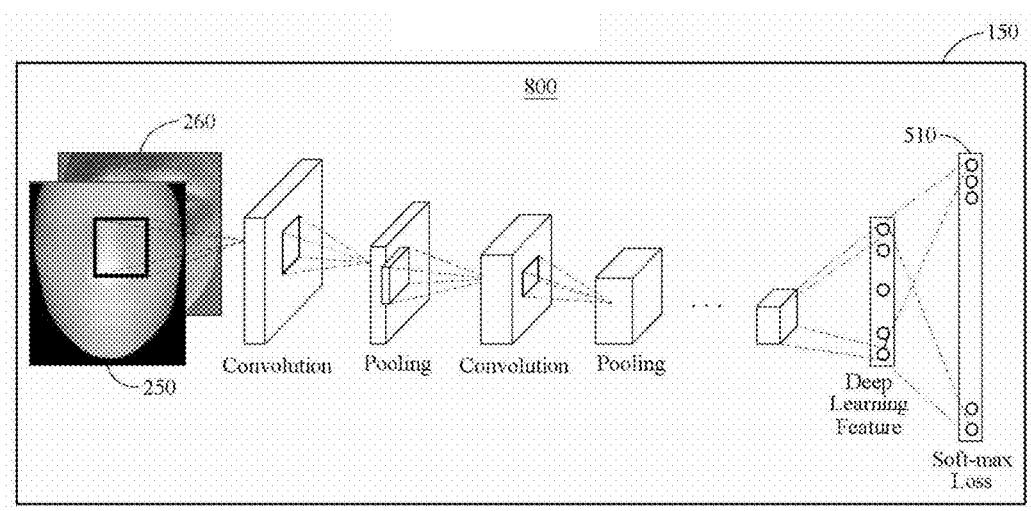
FIG. 8 illustrates an example of determining second feature information based on a third neural network model according to at least one example embodiment.

FIG. 8 illustrates an example of determining second feature information based on a third neural network model according to at least one example embodiment. In at least one example embodiment, a convolutional neural network model may be used as the third neural network model. Referring to FIG. 8, the second feature information determiner 150 may determine the second feature information 510 by inputting, to a convolutional neural network model 800, depth information of the depth image 250 or surface normal information of the normal image 260 in lieu of shape parameter information. Surface normal information may include information associated with at least one normal vector indicating a direction of at least one facial surface on the face in the normalized 2D input image. Here, the depth image 250 may be acquired from a personalized 3D face model or acquired by, for example, a depth camera. The normal image 260 may be acquired from the personalized 3D face model. The second feature information determiner 150 may determine a value extracted from an uppermost layer of the convolutional neural network model 800 to be third feature information. Alternatively, the second feature information determiner 150 may determine the third feature information by connecting the value extracted from the uppermost layer and a value extracted from a hidden layer of the convolutional neural network model 800.

Figure 9A:
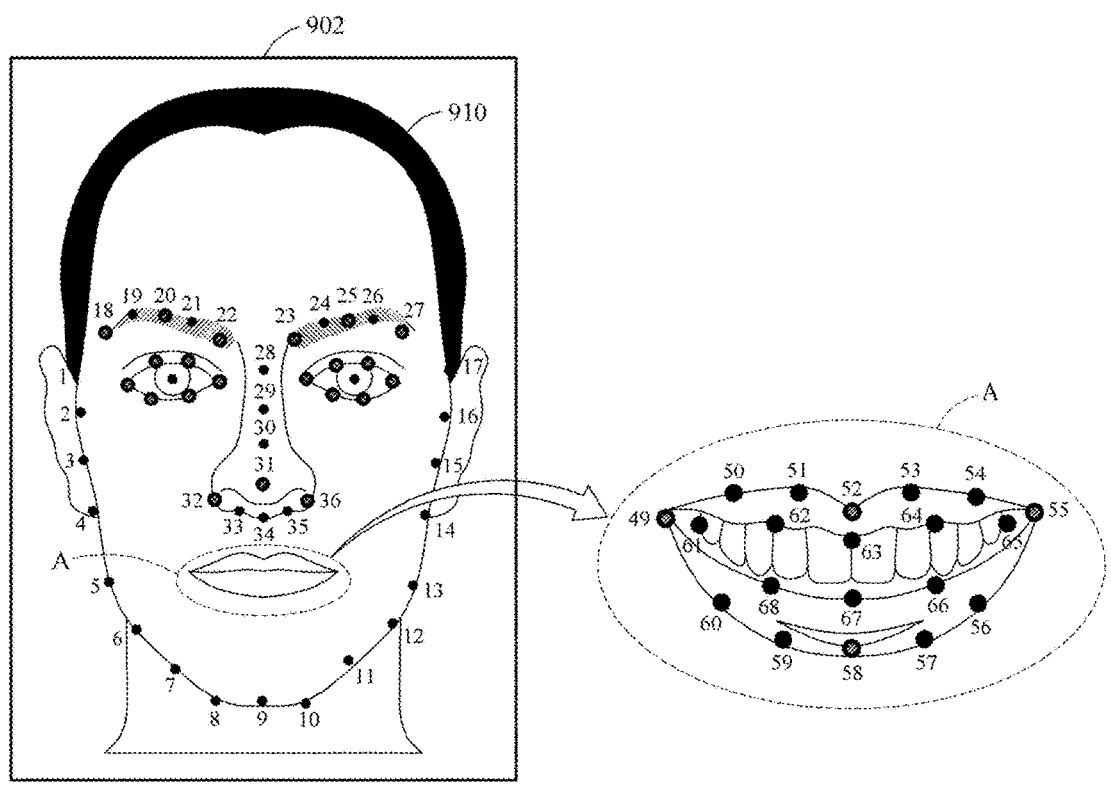

FIGS. 9A and 9B illustrate examples of determining second feature information based on landmarks of a face according to at least one example embodiment. FIG. 9A illustrates landmarks detected from a face area 910 of a 2D input image 902. Here, it is assumed that 68 landmarks are detected. Depending on an example, a relative distance between the landmarks may be more appropriate for expressing facial features when compared to an absolute distance between the landmarks. The second feature information determiner 150 may determine the second feature information based on a distance between the landmarks. In at least one example embodiment, as illustrated in FIG. 9B, the face recognition apparatus 100 may configure a matrix database based on a distance between two landmarks. As shown in FIG. 9B, the second feature information may include a matrix of distances between each pair of the detected landmarks 1-68 in the 2D input image 902. FIG. 9B illustrates a distance between two landmarks for the 68 landmarks based on a type of matrix. Here, LMx denotes a landmark x, and Distance (LMx, LMy) denotes a distance between the landmark x and a landmark y. In this example, x and y may be indexes for identifying a desired (and/or, alternatively, predetermined) landmark among the 68 landmarks detected in at least one example embodiment of FIG. 9A. A matrix database based on the distance between the landmarks may be input to a neural network model, and the second feature information may be extracted from the neural network model.

Figure 10:
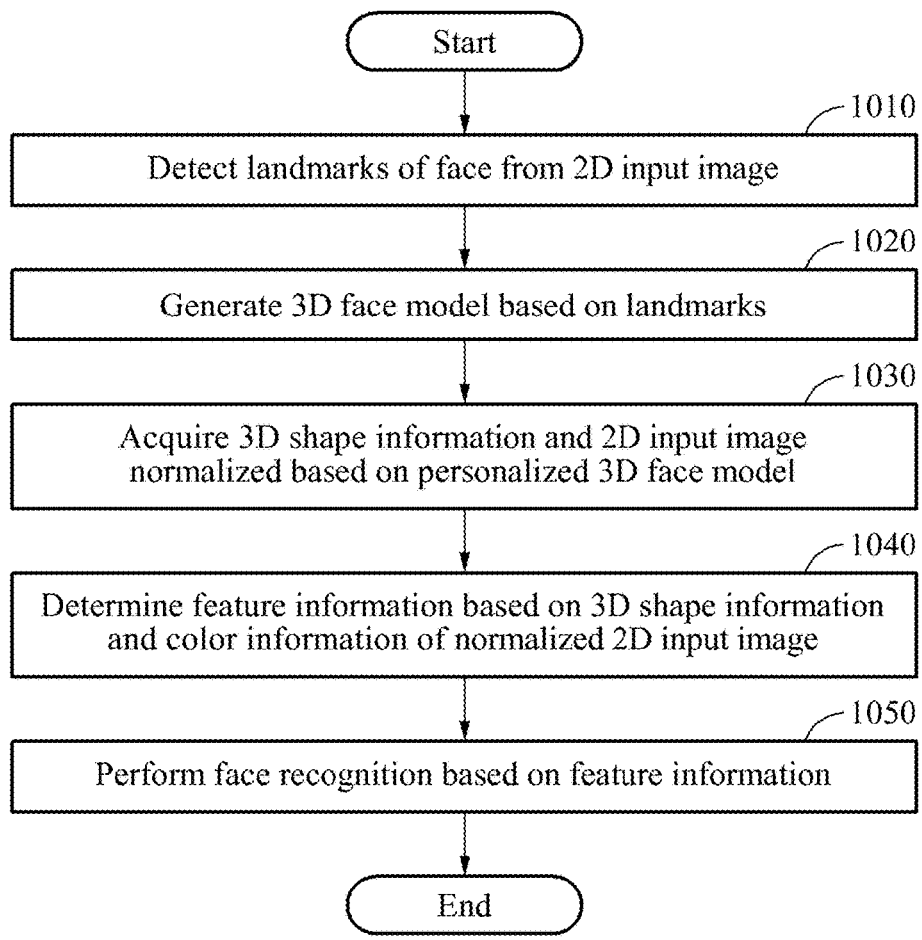
FIG. 10 illustrates an example of a face recognition method according to at least one example embodiment.

FIG. 10 illustrates an example of a face recognition method according to at least one example embodiment.

In operation 1010, the face recognition apparatus 100 may detect facial landmarks from a face area of a user appearing in a 2D input image. The face recognition apparatus 100 may detect landmarks positioned on, for example, an eyebrow, an eye, a nose, and a mouth, from the 2D input image.

In operation 1020, the face recognition apparatus 100 may generate a personalized 3D face model based on the detected landmarks. The face recognition apparatus 100 may generate the personalized 3D face model by adjusting a shape of a generic 3D face model based on positional information of the landmarks detected from the 2D input image.

In operation 1030, the face recognition apparatus 100 may acquire 3D shape information and generate a normalized 2D input image based on the personalized 3D face model. The face recognition apparatus 100 may generate the normalized 2D input image based on a 2D image generated from the personalized 3D face model. Such a 2D image may be a 2D projection of a normalized view of the personalized 3D face model, where the normalized view is a view along a normal vector of the personalized 3D face model. Through a normalization (e.g., generation of the normalized 2D image), positions of facial components and a size of a facial area appearing in the normalized 2D input image may be adjusted, relative to the positions of facial components and a size of a facial area appearing in the 2D input image. Normalization may include adjusting an orientation of the personalized 3D face model to align with a normal vector of the personalized 3D face model and generating a 2D projection of the oriented personalized 3D face model. The face recognition apparatus 100 may generate a depth image or a normal image based on the personalized 3D face model and may acquire 3D shape information of a user face from one or more of the normal image and depth image.

In operation 1040, the face recognition apparatus 100 may determine feature information based on the 3D shape information acquired in operation 1030 and color information of the normalized 2D input image. For example, the face recognition apparatus 100 may determine first feature information based on the color information of the normalized 2D input image using a deep neural network model, and determine second feature information from the 3D shape information using another deep neural network model. The face recognition apparatus 100 may determine final feature information by combining the first feature information and the second feature information.

In operation 1050, the face recognition apparatus 100 may perform face recognition based on the feature information. The face recognition apparatus 100 may calculate a similarity ("correlation") between the feature information determined in operation 1040 and feature information of a stored enrollment image (e.g., "feature information associated with the enrollment image," "feature information associated with an enrolled user face included in the enrollment image," "feature information of the enrolled user face," etc.) and determine whether the calculated similarity satisfies a preset condition (e.g., the feature information determined in operation 1040 correlates with the feature information of the stored enrollment image), thereby determining a face recognition result. The preset condition may be a threshold similarity (e.g., a threshold similarity value), such that the calculated similarity satisfies a preset condition if and/or when the calculated similarity is equal to or greater than the threshold similarity.

In at least one example embodiment, the face recognition apparatus 100 may perform face recognition based on at least one of 1) calculating a similarity between the determined ("generated") first feature information and first feature information associated with the stored enrollment image and 2) calculating a similarity between the determined ("generated") second feature information and second feature information associated with the stored enrollment image.

The face recognition apparatus may determine a face recognition result based on a determination of whether one or more of the calculated similarities between the first feature information and/or the second feature information satisfy one or more respective preset conditions. For example, the face recognition apparatus may determine that the user matches or substantially matches ("correlates") with the enrolled user based on a determination that both 1) the determined ("generated") first feature information correlates with the first feature information associated with the stored enrollment image and 2) the determined ("generated") second feature information correlates with the second feature information associated with the stored enrollment image.

In another example, the face recognition apparatus may determine that the user matches or substantially matches ("correlates") with the enrolled user based on a determination that 1) the determined ("generated") first feature information correlates with the first feature information associated with the stored enrollment image or 2) the determined ("generated") second feature information correlates with the second feature information associated with the stored enrollment image.

Since the descriptions provided with reference to FIGS. 1 through 9B are also applicable here, repeated descriptions with respect to FIG. 10 will be omitted for increased clarity and conciseness.

Figure 11:
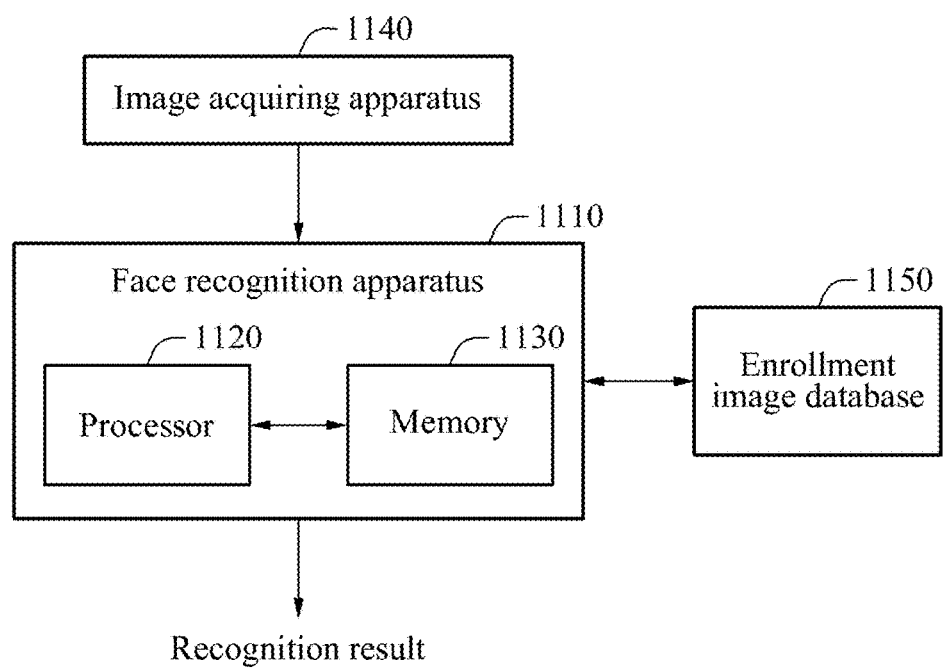
FIG. 11 illustrates another example of a face recognition apparatus according to at least one example embodiment.

FIG. 11 illustrates a face recognition apparatus 1110 according to at least one example embodiment. In at least one example embodiment, apparatus 1110 may include the apparatus 100 illustrated in FIG. 1. An image acquiring apparatus 1140, for example, a camera, may capture a face of a user and transmit an image including the face to the face recognition apparatus 1110. The face recognition apparatus 1110 may perform face recognition by comparing the image to an enrollment image stored in an enrollment image database 1150 in advance. The user may enroll an image of the face in advance, through an enrollment. The enrollment image database 1150 may store the enrolled image as an enrollment image.

The face recognition apparatus 1110 may perform at least one face recognition method and learning method described or illustrated herein. The face recognition apparatus 1110 may output the face recognition result in a form of a voice through a speaker or in a form of a character, a drawing, a video, and the like through a display. However, an example of the face recognition result is not limited thereto. Thus, the face recognition apparatus 1110 may output the face recognition result in various types of forms.

The face recognition apparatus 1110 may include a processor 1120 and a memory 1130. The memory 1130 may communicate with the processor 1120, and may store data to be computed by the processor 1120 and instructions executable by the processor 1120. Such instructions may be referred to herein as computer-readable instructions. The memory 1130 may include a non-transitory computer-readable storage medium. The processor 1120 may include hardware for executing the instructions stored in the memory 1130. To execute the computer-readable instructions, the processor 1120 may retrieve or fetch the computer-readable instructions from, for example, an internal register, an internal cache, the memory 1130, and a storage, thereby executing the computer-readable instructions. Subsequently, the processor 1120 may record at least one execution result in the internal register, the internal cache, the memory, and the storage. In at least one example embodiment, the processor 1120 may execute computer-readable instructions to perform at least one operation described with reference to FIGS. 1 through 10.

The memory 1130 may be a nonvolatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM).

The processor 1120 may be, a central processing unit (CPU), a controller, or an application-specific integrated circuit (ASIC), that when, executing instructions stored in the memory 1130, configures the processor 1120 as a special purpose computer to perform the operations of one or more of the landmark detector 110, 3D shape information acquiring 120, normalizer 130, first feature information determiner 140, second feature information determiner 150, final feature information determiner 160, face recognizer 170, some combination thereof, or the like, including one or more of the operations illustrated in one or more of FIGS. 1-10.

The memory 1130 may include an operating system (OS) and a service providing routine. The processor 1120 may be configured to process computer-readable instructions of, for example, a computer program by performing a basic arithmetic and logic operation, and an input/output (I/O) operation, thereby transforming the processor 1120 into a special purpose processor. The computer-readable instructions may be stored on the memory 1130 or other memory. The processor 1120 may be configured to execute the computer-readable instructions as one or more program modules, such as one or more of the landmark detector 110, 3D shape information acquiring 120, normalizer 130, first feature information determiner 140, second feature information determiner 150, final feature information determiner 160, face recognizer 170, some combination thereof, or the like.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer-readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like.

Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A face recognition method, comprising:
    generating a personalized three-dimensional (3D) face model based on a two-dimensional (2D) input image of a user face;
    generating 3D shape information based on the personalized 3D face model, the 3D shape information including one or more sets of 3D surface coordinate values;
    generating a normalized 2D input image of the user face based on the personalized 3D face model;
    generating feature information associated with the user face, based on the 3D shape information and pixel color values of the normalized 2D input image, the generating the feature information associated with the user face includes,
        generating first feature information based on applying a first deep neural network model to the pixel color values of the normalized 2D input image, and
        generating second feature information based on applying a second deep neural network model to the 3D shape information of the personalized 3D face model, the feature information including the first feature information and the second feature information; and
    performing face recognition based on the feature information.

2. The face recognition method of claim 1, wherein the generating of the 3D shape information includes,
    generating a depth image of the user face based on the personalized 3D face model, the depth image including a 3D shape associated with the user face;
    adjusting the 3D shape based on the normalized 2D input image of the user face; and
    generating the 3D shape information from the adjusted 3D shape.

3. The face recognition method of claim 2, wherein the adjusting the 3D shape includes,
    identifying one or more meshes associated with a plurality of feature points in the normalized 2D input image;
    identifying one or more meshes associated with a plurality of feature points in the depth image; and
    adjusting the 3D shape based on a corresponding relationship between the one or more meshes associated with the normalized 2D input image and the one or more meshes associated with the depth image.

4. The face recognition method of claim 1, wherein the generating of the 3D shape information includes,
    detecting one or more landmarks of the user face in the 2D input image, the one or more landmarks including one or more feature points indicating one or more boundaries or interfaces between different surfaces of the user face; and
    transforming a generic 3D face model to the personalized 3D face model based on the detected one or more landmarks.

5. The face recognition method of claim 1, wherein the generating of the 3D shape information includes,
    generating one of a depth image of the user face and a normal image of the user face based on the personalized 3D face model; and
    generating the 3D shape information from at least one of the depth image and the normal image.

6. The face recognition method of claim 1, wherein the generating the feature information associated with the user face includes,
    generating the first feature information based on applying the first deep neural network model to pixel depth values of a depth image and the pixel color values of the normalized 2D input image, the depth image being generated based on the personalized 3D face model.

7. The face recognition method of claim 1, wherein the generating the feature information associated with the user face includes,
    generating the first feature information based on applying the first deep neural network model to surface normal information of a normal image of the user face, the normal image being generated based on the personalized 3D face model and pixel color values of the 2D input image.

8. The face recognition method of claim 1, wherein the second deep neural network model is an auto-encoder structured neural network model.

9. The face recognition method of claim 1, wherein the generating the normalized 2D input image includes,
    generating pose information associated with a frontal face, based on the personalized 3D face model; and
    normalizing the 2D input image based on the pose information.

10. The face recognition method of claim 1, wherein the generating the normalized 2D input image includes,
    detecting one or more landmarks associated with the user face based on the 2D input image of the user face; and
    normalizing the 2D input image based on the one or more detected landmarks.

11. The face recognition method of claim 1, wherein the performing of the face recognition includes,
    generating final feature information associated with the 2D input image based on the first feature information and the second feature information; and
    generating a face recognition result based on comparing final feature information associated with the 2D input image to feature information associated with a stored 2D image.

12. The face recognition method of claim 1, wherein the performing of the face recognition includes determining whether the user face included in the 2D input image correlates with a stored 2D image of an enrolled user face, based on determining whether the feature information associated with the user face correlates with feature information associated with the enrolled user face.

13. The face recognition method of claim 12, wherein the performing of the face recognition further includes generating an unlocking command signal to enable user access to at least a portion of a terminal device, based on determining that the user face included in the 2D input image correlates with the stored 2D image of the enrolled user face.

14. A non-transitory computer-readable storage medium storing computer-readable instructions, the computer-readable instructions being executable by a processor to cause the processor to perform the method of claim 1.

15. An apparatus comprising:
a memory storing computer-readable instructions; and
a processor configured to execute the computer-readable instructions to,
detect one or more landmarks of a user face based on processing a two-dimensional (2D) image of the user face;
generate a personalized three-dimensional (3D) face model based on the detected one or more landmarks;
generate 3D shape information associated with the user face based on processing the personalized 3D face model;
generate a normalized 2D image based on at least one of the one or more detected landmarks and the personalized 3D face model;
generating feature information associated with the user face, based on the 3D shape information and pixel color values of the normalized 2D image, the generating the feature information associated with the user face includes,
generate first feature information associated with the user face, based on applying a first deep neural network model to pixel color values of the normalized 2D image of the user face, and
generate second feature information associated with the user face, based on applying a second deep neural network model to the 3D shape information, wherein the first deep neural network model differs from the second deep neural network model, the feature information including the first feature information and the second feature information; and
performing face recognition based on the feature information.

16. The apparatus of claim 15, wherein the generating the first feature information includes applying the first deep neural network model to the pixel color values of the normalized 2D image to generate a feature associated with an appearance of the user face.

17. The apparatus of claim 15, wherein the generating the second feature information includes applying the second deep neural network model to the 3D shape information to generate a feature associated with a shape of the user face.

18. A face recognition apparatus comprising:
a memory storing computer-readable instructions; and
a processor configured to execute the computer-readable instructions to,
generate a personalized three-dimensional (3D) face model based on a two-dimensional (2D) input image of a user face;
generate 3D shape information based on the personalized 3D face model, the 3D shape information including one or more sets of 3D surface coordinate values;
generate a normalized 2D input image of the user face based on the personalized 3D face model;
generate feature information associated with the user face, based on the 3D shape information and pixel color values of the normalized 2D input image, the generating the feature information associated with the user face includes,
generating first feature information based on applying a first deep neural network model to the pixel color values of the normalized 2D input image, and
generating second feature information based on applying a second deep neural network model to the 3D shape information of the personalized 3D face model, the feature information including the first feature information and the second feature information; and
perform face recognition based on the feature information.

* * * * *